Figure 1:
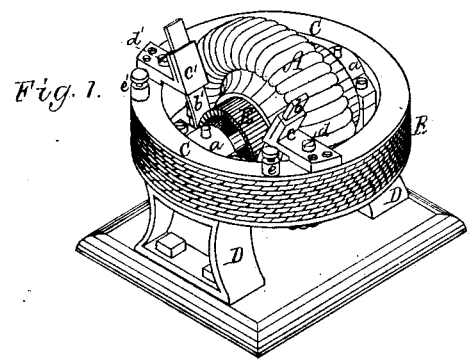

(No Model.) 2 Sheets—Sheet 1.

W. WHEELER.
DYNAMO ELECTRIC MACHINE.

No. 256,182. Patented Apr. 11, 1882.

Witnesses.
S. N. Piper
E. P. Peak

Inventor.
William Wheeler
by R. H. Eddy atty (No Model.) 2 Sheets—Sheet 2.

W. WHEELER.
DYNAMO ELECTRIC MACHINE.

No. 256,182. Patented Apr. 11, 1882.

Witnesses
S. N. Piper.

Inventor.
William Wheeler.
by R. H. Eddy att'y.

UNITED STATES PATENT OFFICE.

WILLIAM WHEELER, OF CONCORD, MASSACHUSETTS.

DYNAMO-ELECTRIC MACHINE.

SPECIFICATION forming part of Letters Patent No. 256,182, dated April 11, 1882.

Application filed May 23, 1881. (No model.)

*To all whom it may concern:*

Be it known that I, WILLIAM WHEELER, of Concord, of the county of Middlesex and State of Massachusetts, have invented certain new and useful Improvements in Dynamo-Electric Machines and Electro-Motors; and I do hereby declare the following to be a description of the invention, reference being had to the accompanying drawings.

My invention is especially designed to effect the magnetization of the field of force in that class of dynamo-electric machines and the motors in which the Gramme ring or armatures of the annular type are used by means of an improved combination of parts, whereby a closer and more direct electrical and mechanical relation is established between said ring or armatures and the parts by and through which the magnetic field is maintained.

My invention is also designed to reduce the number and size of the essential parts of such machines, and at the same time increase their efficiency.

It is well understood that in most, if not all, known or possible devices and appliances for the artificial transformation of physical energy a certain loss or expenditure of such energy, foreign to the purpose of the transformation, unavoidably attends each and every step, function, or element of change occurring in that transformation. Hence if the number of such steps, functions, or elements of change in any process or appliance for the transformation of energy be reduced without impairing the perfection or dynamic economy of the remaining functions and elements, the loss or expenditure of energy foreign to the object in view will be proportionately reduced, and greater economy will therefore attend the desired transformation.

In the case of the various forms of dynamo-electric machines in which the magnetic field or field of force is maintained inductively by means of one or more electro-magnets there are at least two functions or elements of transformation involved in the excitation of the field alone, namely: first, the magnetization of the iron magnet by the flow of an electric current through the coil thereon, and, second, the excitation of the field through the iron magnet by induction. At each of these steps a certain loss of available energy is necessitated by mechanical and physical considerations.

It is also well known that the multiplication of coils, magnets, and other conducting masses of metal composing electrical machines is apt to be attended with increased losses of energy, due to the production or creation of local and useless currents in such parts.

My invention is also intended to avoid such losses to a large extent; and it consists, first, in the direct combination, with a Gramme ring or an annular armature, of one or more electrical coils or helices without the interposition of an iron magnet between them; and, second, in certain mechanical methods of combining and mounting said ring and coils, to be fully described hereinafter. By means of this invention the electric current passing through said coils is caused to act directly upon said ring or armature, and the number of essential parts is reduced, whereby I avoid in a greater degree than heretofore has been effected the losses enumerated above. Furthermore, while in the case of the tangential motion of an annular armature or Gramme ring between the poles of an electro-magnet "induction is exerted only upon one-half of the circumference of the turns of wire" in the coils upon said armature or ring, by my invention induction is exerted equally upon all parts of the circumference of the said turns of wire.

Figure 2:
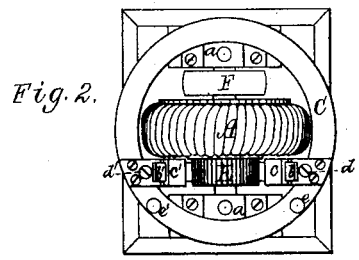
Figure 4:
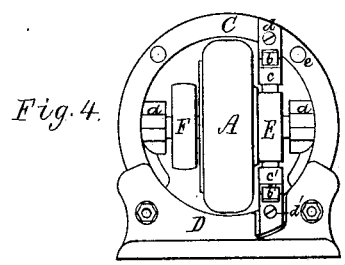
Figure 5:
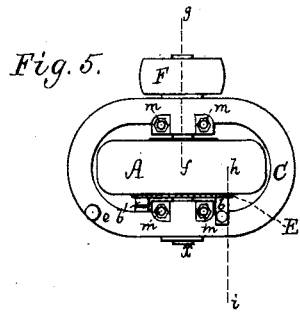
Figure 8:
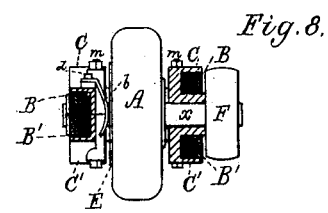
Figure 9:
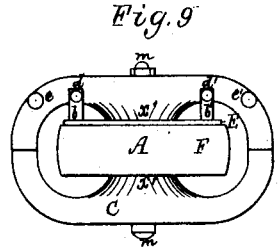
Figure 10:
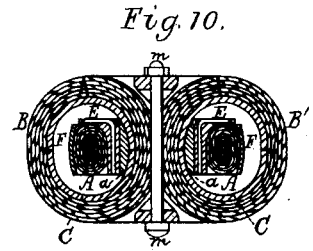
Figure 11:
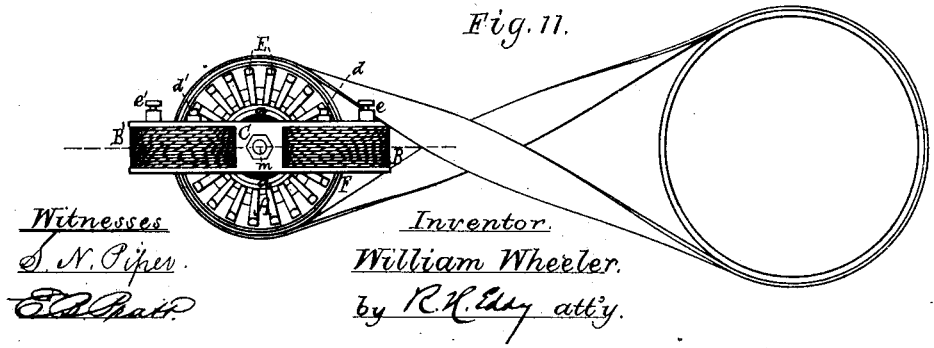

Figure 1 is an isometric view of one form of my invention in which a single exciting-coil is used. Fig. 2 is a plan, and Fig. 3 a side elevation, of the same, while Fig. 4 is an elevation showing another method of mounting the same combination of parts. Figs. 5 to 8, inclusive, represent a modification of the above, in which the exciting-coil, together with the frame or case containing it, is made in two separate parts, in which case and between which coils are formed journal-bearings for the shaft of the revolving armature, Fig. 5 showing a plan, Fig. 6 a plan with the upper part of the coil and case removed, Fig. 7 a side elevation, and Fig. 8 two different transverse sections of the said coil and case. Figs 9 to 11, inclusive, illustrate a form of my invention in which two exciting-coils are employed, each one of which passes through the center and encircles a section or segment of the annular armature, the frame or case containing the said coils being made in two parts and so shaped and joined as to form the pivot or journal upon which the armature revolves. The periphery of the armature or ring is provided with a driving-wheel surface or tire, by which it is made to serve as the driving-wheel of the machine. Fig. 9 is a plan; Fig. 10, a horizontal section; and Fig. 11, a side elevation, showing a driving-belt attached.

It is to be understood that while my invention is shown in these drawings with reference to the Gramme ring only, it is nevertheless applicable to annular armatures in general and in certain of its forms to other armatures, and is designed to cover the use of such armatures as may be substituted for the Gramme ring in the combination herein shown and described.

In Figs. 1 to 4, inclusive, A denotes a Gramme ring or an annular armature, around and in the plane of the axis of which passes the exciting-coil B, contained in the case or frame C, which is supported by the base D. Within the vertical or cylindrical part of the frame C are placed the journal-boxes $a$ $a$, suitably joined to said frame or to the base D, or both, and in these boxes the shaft of the armature A turns.

Bearing against the cylinder of metallic strips or collectors E, at the opposite sides thereof, in the plane of the coil B, (which is the plane of the neutral points in the ring A as magnetized through said coil,) are the two friction brushes or plates $b$ and $b'$, held by the parts $c$ and $c'$. Through the parts $c$ and $c'$ and the connecting-screws $d$ and $d'$ connection is made between the said collectors E and the two opposite ends of the coil B. At some suitable point—preferably half-way—between the said ends of the coil B, the said coil is divided into two parts, and the thus disconnected end of one part is joined with the binding-screw $e$, and that of the other is likewise joined with the binding-screw $e'$. When, therefore, the machine is joined or put into an electrical circuit through the said binding-screws $e$ and $e'$, the coil B becomes a part of or is in that circuit. In other words, the exciting-coil B is included in the main circuit of the machine.

If it is desired to maintain a more or less strong magnetic field within the machine when the external circuit is wholly opened or closed through a large resistance—in other words, to make this what is technically termed a "permanent-field" machine—the two binding-screws $e$ and $e'$ may be directly connected by a conductor of suitable resistance. Then, when the external circuit is opened or closed through a considerable resistance, the internal circuit will still be closed through this connection, and the field of force will be maintained by the passage of the current through said connection, said current increasing as the external resistance increases. This arrangement is especially valuable in machines to be used for electroplating, where the quantity of work to be done at one operation may vary greatly, and where "a very considerable electro-motive force is developed in the plating-bath in a direction opposed to the current from the dynamo-electric machine." Other devices and arrangements for maintaining a permanent field are applicable to my combination of the annular armature and exciting-coil. A current generated by a separate bobbin or machine can be used to magnetize the field through the coil B.

Upon the same shaft with the armature A is fixed the driving-pulley F, through which motion is imparted to or transmitted from the machine when it is used as a generator of electricity or as a mechanical motor, respectively.

Figure 3:
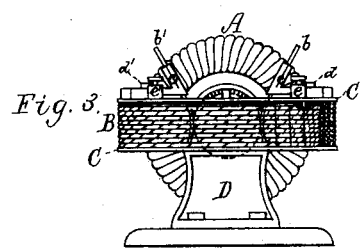

The connections of one of the extreme ends of the coil B with the screw $d'$ and the corresponding intermediate end thereof with the binding-screw $e'$ are shown in Fig. 3, some of the outer layers of the coil being represented therein as broken away.

In Figs. 5 to 8, inclusive, A denotes the annular armature; B and B', the two separable parts of the exciting or magnetizing coil; C and C', the corresponding parts of the frame or case containing said coil. The parts C and C' are enlarged at the intersection of the shaft $x$ with the line of their junction, $k$ $l$, and provided with the journal-bearings for said shaft $a$ and $a'$, respectively, above and below which the parts B and B' of said coil pass. The parts C and C' of the frame, together with the journal-bearings $a$ and $a'$, formed thereon or connected thereto, are securely joined and held together by the bolts $m$ $m$ $m$ $m$, by means of which the said bearings may be adjusted and the wear thereof taken up.

$o$ $o$ represent pieces of rubber or other suitable packing material, inserted in the triangular space between the two parts of the magnetizing-coil and against the joint between the two parts $a$ and $a'$ of the journal-boxes, such pieces being to prevent the lubricating-oil from escaping laterally from said boxes into the coil.

E denotes the disk, composed of those parts of the metallic strips or collectors which are placed radially, said collectors being connected with different parts of the helix upon the Gramme ring A in the usual manner. Against this disk of radiating strips the two friction brushes or plates $b$ and $b'$ press, said brushes having connection through the screws $d$ and $d'$, respectively, with the extreme ends of the two parts B and B', respectively, of the exciting-coil. The two intermediate ends of the two parts B and B' are jointed to the binding-screws $e$ and $e'$, respectively. Thus the connections are identical with those of the form already described, and the same modifications thereof are applicable to both forms of the invention.

The coil B B' and frame C C' are made oblong in plan, so as to approach as closely as possible to the sides of the revolving armature, thus reducing the length of wire and therefore the amount of internal resistance in the magnetizing-coil, or admitting of the use of a coil having the greatest number of turns possible with a given length or weight of wire. This arrangement necessitates, as we have already seen, the passage of the shaft $x$ through said coil and frame, and also the placing of the driving-pulley F of said shaft outside the periphery of the coil and frame, all being substantially as shown in the drawings.

Figure 6:
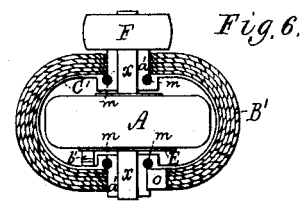
Figure 7:
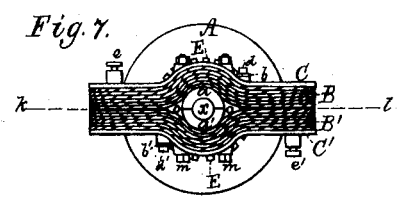

By removing the bolts $m\ m\ m\ m$ the upper parts of the case C and coil B may be taken off without disturbing any of the other parts or connections, leaving the machine as shown in Fig. 6. The cross-section of the said case and coil shown in the right and left portions of Fig. 8 are made respectively upon the lines $f g$ and $h i$ shown in Fig. 5. This form may be mounted either as shown in Figs. 1 or 4 or in any other suitable manner.

The shaft $x$ may simply pass through the sides of the case C C', substantially as shown, and have its bearings in journal-boxes outside of and distinct from such case.

In Figs. 9 to 11, inclusive, A represents the Gramme ring; B and B', the two magnetizing-coils, each of such coils being linked into and extended through the ring A. C is the frame or case, in two parts, containing said coil. The two portions of the frame C have each the conical or cylindrical part $x'$ extending into the orifice or aperture of said ring, so as to form a pivot or journal, on which the ring turns. The Gramme ring or annular armature A is provided and fitted with the ring or annular lining $a\ a$, in place of the customary hub in such armatures, which constitutes a fixed journal-box, by which the armature revolves on and about the conical or cylindrical parts $x'\ x'$ of the case C.

E represents the radiating metallic collectors, against which press the friction brushes or plates $b$ and $b'$, each of which, through the connecting-screws $d$ and $d'$, is joined with one end of one of the coils B and B', respectively. The remaining intermediate ends of said coils are joined to the binding-screws $e$ and $e'$, said coils being so wound and connected that currents of the same sign pass around each of them in the same direction, as when one coil only is used, as already described. Thus the connections are such as those of the forms hereinbefore described, and the same modifications thereof are applicable to this form of my invention.

Motion or rotation is imparted to or transmitted from the armature A through the periphery thereof by means of a driving-belt, friction-rollers, or gearing, such belt being represented in Fig. 11 of the drawings. The annular armature A is fitted with an external ring or tire, F F, having a driving-pulley surface, whereby the combined armature and tire is made the driving-wheel of the machine. The armature in either of the other forms of my invention hereinbefore described may likewise be fitted with a driving-tire and be made the driving-wheel of the machine, whereby greater compactness and a reduction of parts may be secured.

It is further to be understood that two or more pairs of exciting-coils or single coils may be used in combination with the annular armature A, said coils to pass through the orifice of said armature, as in the form last described, or to entirely encompass it, as in the form first described, said coils in either case to lie in planes containing the axis of said armature, and to be disposed at suitable intervals and angles from each other about said axis.

Some of the direct effects of the passage of an electric current through the coil or coils B in the several combinations above described and illustrated, when the machine is used for generating electricity, are, first, it magnetizes each half-segment of the iron nucleus of the annular armature encircled thereby, so as to develop magnetic poles in the same relations to each other as result from induction by one or more magnets arranged as in the Gramme and other annular armature machines; second, it induces a current of the same sign (as that supposed to flow through the exciting-coil) to flow in the opposite direction through the helices around each of the magnetic segments of said iron nucleus as said helices become parallel with said coil by the revolution of the armature. These two currents will unite with two others generated in the same helices by the constant changes in the distribution of the polarity of the iron nucleus caused by the rotation in the magnetic field, the four currents thus produced forming a single one, which is removed through the Gramme collectors and used in an external circuit, as well as in the internal circuit of the machine itself.

As in the case of all other magneto-electric machines, this invention may be used either as a generator of electricity or as a mechanical motor. When the machine is placed in a closed electrical circuit certain attractions and repulsions take place between the helices and coils, all of which combine in a tendency to cause the rotation of the armature in a certain direction against whatever mechanical resistance or force may oppose this tendency. Now, when this opposing mechanical force (or resistance) is more than sufficient to overcome the above-described attractions and repulsions, then the machine acts as a generator or a dynamo-electric machine. When, on the other hand, the opposing mechanical resistance (or force) is overcome by the combined attractions and repulsions aforesaid, the armature and driver revolve in the contrary direction, and the machine operates as a motor. In the former case mechanical energy predominates and determines the direction in which the machine shall rotate, while in the latter electrical energy is paramount and causes the rotation to be reversed. In either case the source of the predominant form of energy must be outside of the machine itself.

Having thus described my invention, what I claim as new, and desire to secure by Letters Patent, is—

1. In a dynamo-electric machine or motor, the combination of the annular armature A and two or more coils, B B', passing through it, with the frame C, having the conical or cylindrical parts $x'$ $x'$, substantially as set forth.

2. In a dynamo-electric machine or motor, the annular armature A, provided and fitted with the fixed journal-box $a$ $a$, substantially as set forth.

3. In a dynamo-electric machine or motor, the annular armature A, having the fixed journal-box $a$ $a$ and driving-tire F, in combination with the coils B B' and frame C, all being substantially as set forth.

WILLIAM WHEELER.

Witnesses:
R. H. EDDY,
E. B. PRATT.